(12) United States Patent
Wang et al.

(10) Patent No.: US 11,630,861 B2
(45) Date of Patent: Apr. 18, 2023

(54) METHOD AND APPARATUS FOR VIDEO SEARCHING, TERMINAL AND STORAGE MEDIUM

(71) Applicant: BEIJING BYTEDANCE NETWORK TECHNOLOGY CO., LTD., Beijing (CN)

(72) Inventors: Ziang Wang, Beijing (CN); Yonghua Zhang, Beijing (CN); Xiaolu Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/722,334

(22) Filed: Apr. 16, 2022

(65) Prior Publication Data

US 2022/0237227 A1 Jul. 28, 2022

Related U.S. Application Data

(63) Continuation of application No. PCT/CN2020/114799, filed on Sep. 11, 2020.

(30) Foreign Application Priority Data

Oct. 17, 2019 (CN) .......................... 201910990463.X

(51) Int. Cl.
 *G06F 16/00* (2019.01)
 *G06F 16/73* (2019.01)
(52) U.S. Cl.
 CPC ..................... *G06F 16/73* (2019.01)
(58) Field of Classification Search
 CPC ....... G06F 16/73; G06F 16/783; G06F 16/738
 See application file for complete search history.

(56) References Cited

U.S. PATENT DOCUMENTS

2007/0250775 A1* 10/2007 Marsico ............... H04N 21/235
                                                        707/E17.119
2012/0229629 A1*  9/2012 Blumstein-Koren .......................
                                                        G06F 16/7837
                                                        382/103

(Continued)

FOREIGN PATENT DOCUMENTS

CN      104112129 A      10/2014
CN      105095483 A      11/2015
(Continued)

OTHER PUBLICATIONS

International Patent Application No. PCT/CN2020/114799; Int'l Search Report; dated Dec. 17, 2020; 2 pages.

(Continued)

*Primary Examiner* — Jared M Bibbee
(74) *Attorney, Agent, or Firm* — BakerHostetler

(57) ABSTRACT

Provided are a method and device for video search, a terminal and a storage medium. The method includes: receiving a first event generated by triggering a first control in a video playback page; acquiring, in response to the first event, a current video image frame played in the video playback page when the first event is triggered; acquiring a first to-be-searched target positioned by a second control in the current video image frame and a first display position of the first to-be-searched target in the current video image frame, and displaying the second control on the first display position; and acquiring a first recommendation result corresponding to the first to-be-searched target, and displaying the first recommendation result in a search result page.

20 Claims, 5 Drawing Sheets

(56) References Cited

U.S. PATENT DOCUMENTS

| | | | | |
|---|---|---|---|---|
| 2014/0178041 A1* | 6/2014 | Thevar | ............... | G11B 27/3027 386/241 |
| 2016/0063104 A1* | 3/2016 | Barsook | ............... | G06F 16/738 707/722 |
| 2020/0236422 A1* | 7/2020 | Lee | ................... | H04N 21/4316 |
| 2021/0034668 A1* | 2/2021 | Chen | ................... | G11B 27/005 |

FOREIGN PATENT DOCUMENTS

| | | |
|---|---|---|
| CN | 106776957 A | 5/2017 |
| CN | 107657011 A | 2/2018 |
| CN | 109218750 A | 1/2019 |
| CN | 109388725 A | 2/2019 |
| CN | 110121093 A | 8/2019 |
| CN | 110704684 A | 1/2020 |
| EP | 2439741 A1 | 4/2012 |

OTHER PUBLICATIONS

Yingying; "High-definition TV multi-screen interactive mobile client design and realization"; Nanjing University of Posts and Telecommunications for the Degree of Master Engineering; Oct. 2017; 74 pages (contains English Abstract on p. 5).

Claudiu Cobarzan; "Evaluating Interactive Search in Videos With Image and Textual Description Defined Target Scenes"; IEEE Int'l Conf. of Multimedia and Expo Workshops; Sep. 2014; 6 pages.

\* cited by examiner

METHOD AND APPARATUS FOR VIDEO SEARCHING, TERMINAL AND STORAGE MEDIUM

CROSS REFERENCE TO RELATED APPLICATION

The present application is a continuation of International Patent Application No. PCT/CN2020/114799, filed on Sep. 11, 2020, which claims priority to Chinese Patent Application No. 201910990463. X, titled "METHOD AND APPARATUS FOR VIDEO SEARCHING, TERMINAL AND STORAGE MEDIUM", filed on Oct. 17, 2019, both of which are incorporated herein by reference in their entireties.

TECHNICAL FIELD

The present disclosure relates to the field of computer technology, and in particular to a method for video search, a device for video search, a terminal and a storage medium.

BACKGROUND

A current image identifying technology is that after taking a photo, the photo is transmitted to a server, and then the server identifies and searches for an item or a person in the image, and then returns a search result to a sender. Currently there is no implementation solution for searching based on a video.

SUMMARY

In order to solve the existing problems, a method for video search, a device for video search, a terminal and a storage medium are provided in the present disclosure.

Following technical solutions are provided according to the present disclosure.

In some embodiments, a method for video search is provided according to the present disclosure. The method includes: receiving a first event generated by triggering a first control in a video playback page; acquiring, in response to the first event, a current video image frame played in the video playback page when the first event is triggered; acquiring a first to-be-searched target positioned by a second control in the current video image frame and a first display position of the first to-be-searched target in the current video image frame, and displaying the second control on the first display position; and acquiring a first recommendation result corresponding to the first to-be-searched target, and displaying the first recommendation result in a search result page.

In some embodiments, a device for video search is provided according to the present disclosure. The device includes: a receiving module, configured to receive a first event generated by triggering a first control; an acquiring module, configured to acquire a current video image frame played in the video playback page when the first event is triggered, a first to-be-searched target positioned by a second control in the current video image frame and a first display position of the first to-be-searched target in the current video image frame, and a first recommendation result corresponding to the first to-be-searched target; and a displaying module, configured to display the first recommendation result in a search result page.

In some embodiments, a terminal is provided according to the present disclosure. The terminal includes: at least one memory configured to store program codes; and at least one processor configured to invoke the program codes stored in the at least one memory to perform the method described above.

In some embodiments, a storage medium is provided according to the present disclosure. The storage medium stores program codes for performing the method described above.

The method for video search provided by the present disclosure can classify and identify a video image frame according to selected current video content, and the identified content includes a person and an item displayed in all video images or a person and an item within a selected area. The embodiments of the present disclosure can facilitate a user to acquire information about the commodity and the person in the video.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF THE EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

Term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first'" "second" and so on mentioned in the present disclosure are only used to distinguish different apparatuses, modules or units, rather than limit an order of functions performed by the apparatus, module or unit or limit interdependence.

It should be noted that, the terms "a" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

The solutions provided by the embodiments of the present disclosure will be described in detail below with reference to the accompanying drawings.

Figure 1:
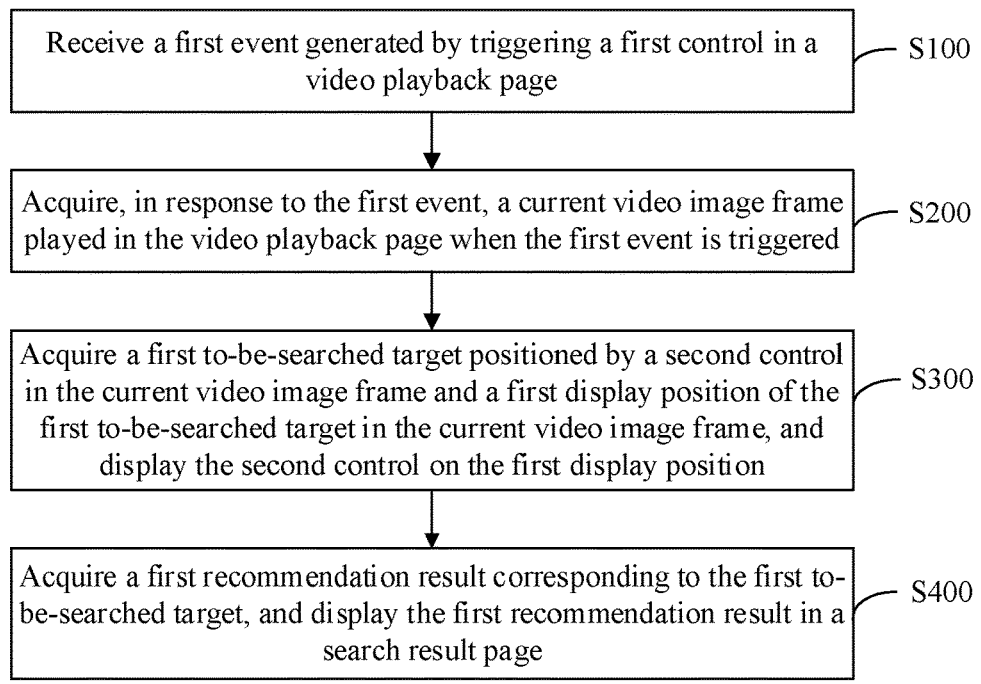
FIG. 1 is a flowchart of a method for video search according to an embodiment of the present disclosure.

As shown in FIG. 1, FIG. 1 is a flowchart of a method for video search according to an embodiment of the present disclosure. The method includes steps S100 to S400.

In S100, a first event generated by triggering a first control is received in a video playback page.

Figure 2:
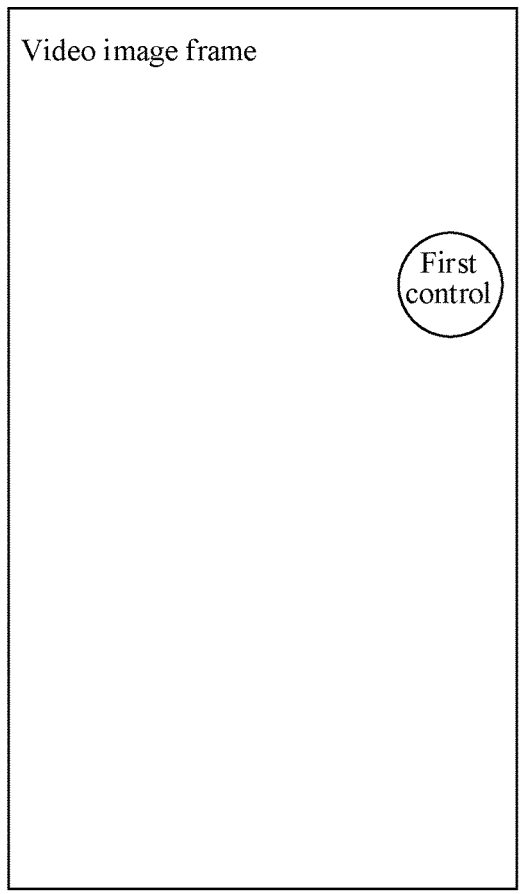
FIG. 2 is a schematic diagram of a video image frame played on a video playback page according to an embodiment of the present disclosure.

As shown in FIG. 2, FIG. 2 is a schematic diagram of a video image frame played on a video playback page according to an embodiment of the present disclosure. Specifically, the embodiment of the present disclosure may include the first control as a startup path, which may be, for example, a box selection button or an image identifying button for a program on a terminal executing the program. The difference between the box selection button and the image identifying button is that clicking the image identifying button can send automatic identifying instruction information, that is, the information that is considered valid in a frame is automatically selected. While the box selection button may refer to a case that part of information of an image is selected by a user. More specifically, when the video is played to a certain frame, the user issues an acquisition instruction. In this embodiment of the present disclosure, the acquisition instruction may be issued by clicking the first control as shown in FIG. 2. It may be understood that, even though the first control in FIG. 2 is presented in the form of a circular icon, in other embodiments of the present disclosure, the first control may also be presented in other forms, and is not limited to the form of a circle or an icon. Correspondingly, the first event may include that the first control is activated to be displayed in a manner such as a shape change; it may also include, for example, that a brightness of a display area other than the first control is lowered for display. Apparently, the above examples are only used for illustration, the embodiments of the present disclosure may further include other methods for activating presentation, which are not limited to the foregoing examples.

In S200, in response to the first event, a current video image frame played in the video playback page when the first event is triggered is acquired.

In the embodiment of the present disclosure, typically, for example, the video image frame in the playback of a video file may be acquired. Specifically, the playback of the video file may be stopped according to the instruction information issued by the user, for example, control deformation or brightness change generated by triggering the first control, and a corresponding acquired video image frame is determined. For another example, a time stamp of the video playing at the trigger point is recorded, and then the video image frame in the corresponding video file is determined according to the time stamp.

S300: a first to-be-searched target positioned by a second control in the current video image frame and a first display position of the first to-be-searched target in the current video image frame are acquired, and the second control is displayed on the first display position.

Figure 3:
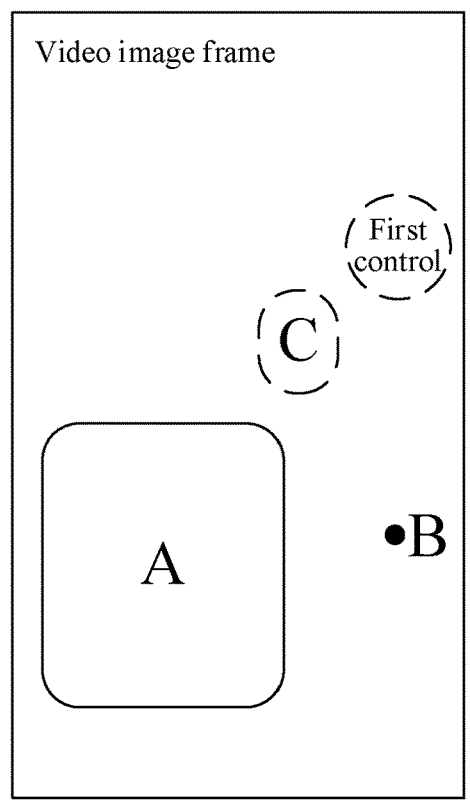
FIG. 3 is a schematic diagram of converting a first control into a second control according to an embodiment of the present disclosure.

The second control may include at least one of a floating box or a floating point. Specifically, in the embodiment of the present disclosure, the second control includes a floating box and a floating point, the first to-be-searched target includes a first target and a second target. In this embodiment, the first target positioned by the floating box and the second target positioned by the floating point in the current video image frame are acquired; a display position of the first target in the current video image frame and a display position of the second target in the current video image frame are acquired; and the floating box is displayed on the display position of the first target in the current video image frame, and the floating point is displayed on the display position of the second target in the current video image frame. More specifically, in this embodiment of the present disclosure, a second control may be invoked by triggering the first control, and the second control may be used to position the first to-be-searched target; or, the second control may be obtained by converting the first control. As shown in FIG. 3, FIG. 3 is a schematic diagram of converting a first control into a second control according to an embodiment of the present disclosure. In the figure, a box A and a point B are the first to-be-searched targets. When the first control is triggered, the first control may become, for example, a rectangle with rounded corners, and at the same time, it becomes larger and moves towards A, finally forms a floating box which has a shape of a rectangle with rounded corners and which used for positioning the target A. In the embodiment of the present disclosure, the video image frame may also be divided into a background part and a main part, and then a display parameter corresponding to the floating box is be acquired. The display parameter may include position information and size information of the floating box, and specifically may include: an X coordinate of the first pixel, on the upper left corner of the floating box, in the video image frame; a Y coordinate of the first pixel, on the upper left corner of the floating box, in the video image frame; and a length and a width of the floating box, and so on. The floating box may be positioned according to the position information and size determined on the video image frame based on the above four display parameters. The floating box may be represented by a display starting coordinate and the length and the width of the floating box, to set a limited area of the floating box. In addition, in addition to the above-mentioned floating boxes with regular shapes, the floating box of this embodiment may also have an irregular shape identified by a boundary. Or an initial position and a swipe path of the floating box is determined, then a function f(x) which changes relative to the change of the abscissa x is obtained. In addition, the embodiment of the present disclosure may include more to-be-searched targets, the first to-be-searched target may include both A and B. Further, the embodiment of the present disclosure does not limit the number of the first to-be-searched targets, more or less first to-be-searched targets should also be included in the protection scope of the embodiment of the present disclosure. The second control may not be limited to the form of a floating box or a floating point, and the second control of other reasonable forms may be considered as simple replacements of the above embodiment.

In step S400, a first recommendation result corresponding to the first to-be-searched target is acquired, and the first recommendation result is displayed in a search result page.

Figure 4:
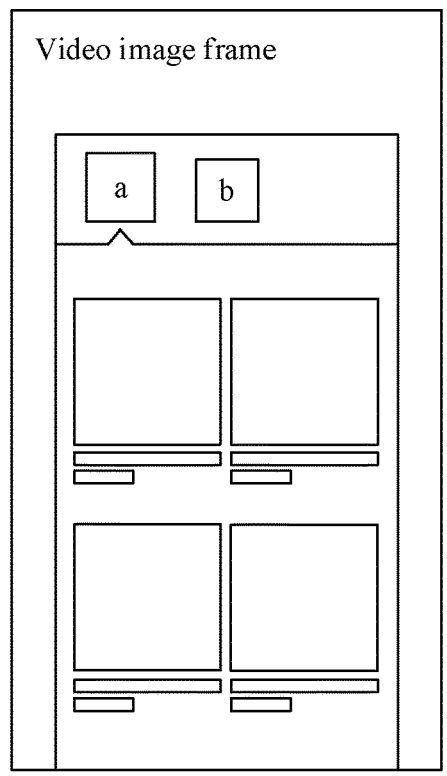
FIG. 4 is a schematic diagram of a search result page according to an embodiment of the present disclosure.

Specifically, in the embodiment of the present disclosure, a second event generated by triggering a second control may be received, and the search result page is evoked in response to the second event, the search result page at least partially covers the current video image frame and blocks the second control. A first to-be-recommended result corresponding to the first target and a second to-be-recommended result corresponding to the second target are acquired; a first label for identifying the first target and the first to-be-recommended result are displayed on a first area in the search result page; and a second label for identifying the second target and the second to-be-recommended result are displayed on a second area in the search result page. More specifically, the embodiment of the present disclosure may include a step of searching the first recommendation result corresponding to the second control when the second control is triggered, and evoking the search result page for displaying the first recommendation result. The search result page may partially or completely cover the video image frame. In the embodiment of the present disclosure, it is possible to identify both an item and a person in one frame of video image. In this case, the search results related to the person and the item may be displayed separately or displayed in labels. As shown in FIG. 4, FIG. 4 is a schematic diagram of a search result page according to an embodiment of the present disclosure. The search result page shown in FIG. 4 includes a first to-be-recommended result corresponding to a first target A and a second to-be-recommended result corresponding to a second target B displayed in columns. For example, the first target A is a commodity, and the upper part of the search result page is the same or similar commodity corresponding to commodity A. The second target B is a person, and the lower part of the search result page is a related video result corresponding to the person B. The embodiment of the present disclosure may further include a first label a for identifying the first object A and a second label b for identifying the second object B. The search result page may include, for example, one horizontal column and multiple vertical columns. The horizontal column may display labels corresponding to different targets in the video, that is, corresponding to the commodities/persons in sequence. As shown in the figure, when displaying the first to-be-recommended result corresponding to the first target A, the first label a may be slightly enlarged as an identifier; and when switching to display the second to-be-recommended result corresponding to the second target B, a size of the first label a may be restored, and the second label b is enlarged. It can be understood that in other embodiments of the present disclosure, other corresponding forms may also be adopted, which are not limited herein. Correspondingly, the vertical columns may correspond to the horizontal columns respectively, and each vertical column may display, for example, other videos a related to the person A, and the same and similar commodity b of the commodity B in the vertical direction. The horizontal column may be a fixed column or a scrolling column. When there are not many identifying targets, the labels may be arranged horizontally; when there are many identifying targets, the labels be selectively displayed by horizontal scrolling. Similarly, vertical commodities/videos may also be arranged in a vertical scroll bar. As for the order of arrangement, person videos may be ranked, for example, according to the click rate; and the commodities may be ranked according to the similarity with the target commodity as described above. Of course, in the embodiment of the present disclosure, other arrangement logics may also be used, as long as reasonable results are obtained. The first to-be-recommended result may be presented in two columns as shown in the figure, or arranged in other arrangements, and the embodiment of the present disclosure does not limit the arrangement of the results. The order of arrangement, for example, may be based on similarity scores, as the basis for ranking multiple search results, and results with high similarity may be ranked first. Other factors affecting ranking may also include, for example, video playback amount, which are not limited here.

In addition, the first to-be-searched target may include a valid target and an invalid target, and the method in the embodiment of the disclosure may further include: acquiring all video image frames of a video played in the video playback page; and acquiring the valid target of each of the video image frames to obtain global results. The valid target includes at least one of a person, a commodity and an item; the invalid target is a target result other than the valid target. Specifically, the embodiment of the present disclosure can classify the first to-be-searched target by using a model such as a multiplex detection model to screen targets, the detection model may specifically be a commodity detection model, a face detection model, and an item detection model. The model may include, for example, face feature information, commodity feature information, and the like. The first to-be-searched target is then classified into at least one of the categories. If the first to-be-searched target is the valid target, the first recommendation result corresponding to the valid target is acquired and the first recommendation result is displayed in the search result page; if the first to-be-searched target is the invalid target, prompt information indicating that there is no search result is displayed in the search result page. Alternatively, if the first to-be-searched target is the valid target, the first recommendation result corresponding to the valid target is acquired and the first recommendation result and the global results other than the first recommendation result are sequentially displayed in the search result page; if the first to-be-searched target is the invalid target, the global results are displayed in the search result page.

Figure 5:
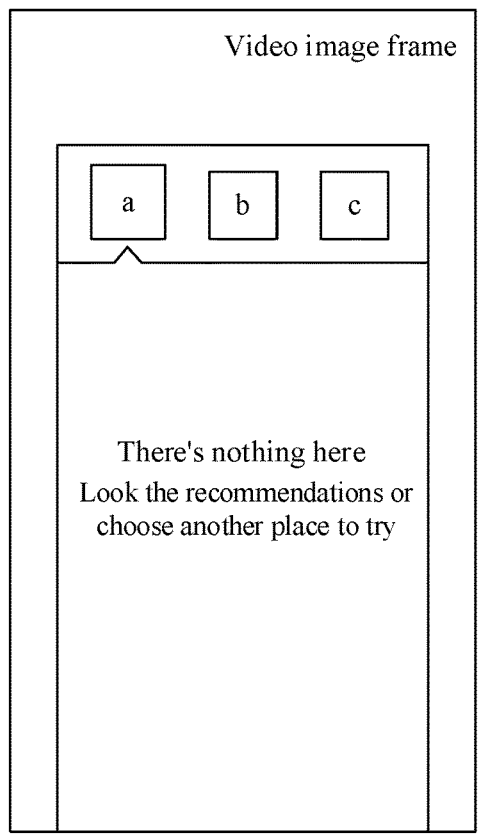
FIG. 5 is a schematic diagram of a search result page according to another embodiment of the present disclosure.
Figure 6:
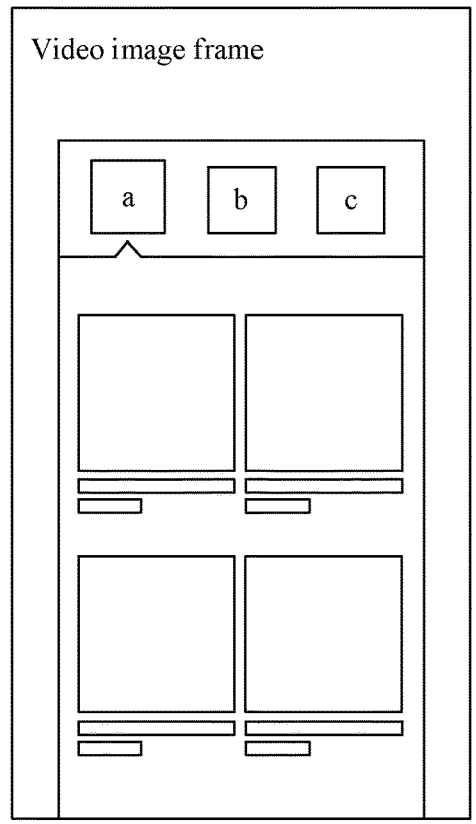
FIG. 6 is a schematic diagram of a search result page according to still another embodiment of the present disclosure.

Specifically, the acquisition of the first recommendation result in the embodiment of the present disclosure may include two methods: online acquisition and offline acquisition. More specifically, the first recommendation result may be data stored on the server or locally, such as item introduction, purchase link, or person-related video, or other related information. The returned result may be the identified area coordinates and the identified valid targets therein. If the server does not have the relevant cache of the video file, the server may perform online identification in real time, compare the features with the products of a product library in the server, and then return the same or similar product results. If the relevant content is identified as a person, for example, face information may be extracted to perform video feature search to find other videos containing the image or name of the person. If the search process is carried out on the server, the relevant results may be transmitted through the client interface. In particular, if the client, such as a program installed on a mobile phone, has a self-built commodity library, the self-built commodity library may also directly retrieved according to the identification result. Further, an external link may also be set in the self-built commodity library. A process may jump to, for example, applets, other apps, or web pages through the external link. The offline acquisition method includes acquiring the result of the current video image frame and returning the global search results. The online acquisition method may not obtain valid results, that is, the commodity or personal information cannot be identified, therefore, the user interface displays the prompt information as shown in FIG. 5. In a case that offline cached results are available, the user can obtain not only the search results of the current video image frame, but also the global results; thus, even if valid results of the current video image frame cannot be identified, the user can still obtain the global results. It should be noted that, when returning the current result and the global results at the same time, the current result may be arranged first, and the global results may be arranged later to provide the user with more choices. As shown in FIG. 6, FIG. 6 is a schematic diagram of a search result page according to still another embodiment of the present disclosure. In FIG. 6, after the current results a and b, one global result c of the global results is also provided. Preferably, in this embodiment, tags may also be set, which can not only help classification, but also serve as a basis for deduplication, such as comparing the results of the same tags in the global results to determine whether they belong to the same item/same person, or similar items/similar persons. If the results belong to the same item/same person, only one result may be returned as the result of deduplication. If the results belong to similar items/similar persons, they may classified to one category.

The method according to the present disclosure may also include the step of re-determining the to-be-searched target. In one embodiment, the search result page is moved to an edge of the current video image frame and a part of the search result page is hidden to display the second control. It is detected whether the first display position where the second control is located has changed, and a second display position of the second control is acquired in a case that the first display position where the second control is located has changed; a second to-be-searched target is determined based on the second display position; a second recommendation result corresponding to the second to-be-searched target is acquired; and the search result page is evoked, and the first recommendation result in the search result page is replaced with the second recommendation result.

Figure 7:
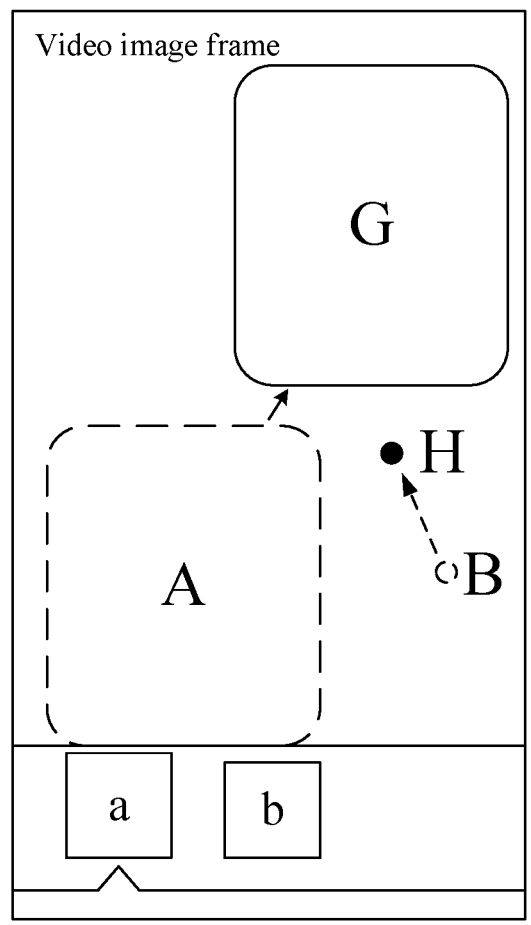
FIG. 7 is a schematic diagram of replacing a to-be-searched target according to an embodiment of the present disclosure.

Specifically, as shown in FIG. 7, FIG. 7 is a schematic diagram of replacing a to-be-searched target according to an embodiment of the present disclosure. In this embodiment, the search result page is partially hidden under the current video image frame. In other embodiments of the present disclosure, the search result page may also be picked up in other ways, which is not limited here. The position of the floating box is moved from A to G, and/or the position of the floating point is moved from B to H, thereby obtaining the second to-be-searched. For steps of acquiring the second recommendation result based on the second to-be-searched target and displaying the second recommendation result, reference may be made to the steps of acquiring the first recommendation result based on the first to-be-searched target and displaying the first recommendation result, which will not be repeated here.

In particular, the embodiment of the present disclosure may further include a risk control model, which may specifically be a shielding mechanism provided with filtering features. For example, if the identified to-be-searched target includes a preset filtering feature, it is possible to choose to intercept the identification result and not issue a search matching instruction to play a filtering role. The filtering criterion may be that violent scenes, revealing pictures, or the identified face features involving privacy are blocked. More specifically, the face detection model may only include celebrity maps, and when the detection results do not match the face detection model, a filter feature is added, and the result is that neither detection nor search are performed, so personal privacy can be protected. Of course, the filtering criterion in the embodiment of the present disclosure is not limited to the above, and any reasonable filtering criterion may be included in the embodiment of the present disclosure.

The method for video search provided by the embodiment of the present disclosure may be used for on detection or offline detection. For a commodity serving side, the detection and search results may be linked with the commodity library, which can help merchants to better arrange the consumption stock and consumption increment, and optimize the product structure. For a video serving side, it can also play the role of heat guidance and drainage guidance, so that content providers can arrange content services more reasonably. In other aspects, a content ranking strategy may also be established according to the returned results, and a rule generator may be automatically established according to, for example, the number of likes and content quality.

Figure 8:
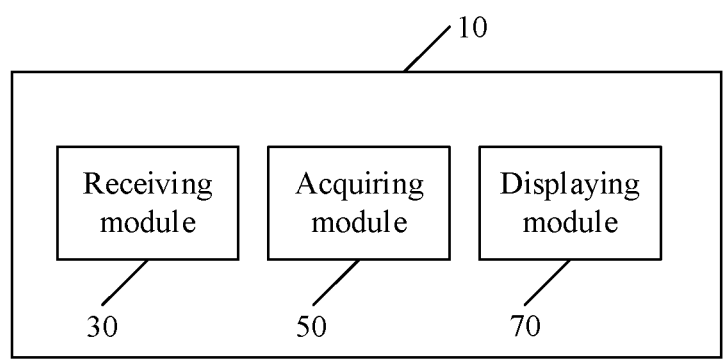
FIG. 8 is a schematic structural diagram of a device for video search according to an embodiment of the present disclosure.

As shown in FIG. 8, a device for video search 10 is provided according to an embodiment of the present disclosure. The device includes: a receiving module 30, an acquiring module 50 and a displaying module 70. The receiving module 30 is configured to receive a first event generated by triggering a first control. The acquiring module 50 is configured to acquire a current video image frame played in the video playback page when the first event is triggered, a first to-be-searched target positioned by a second control in the current video image frame and a first display position of the first to-be-searched target in the current video image frame, and a first recommendation result corresponding to the first to-be-searched target. The displaying module 70 is configured to display the first recommendation result in a search result page.

Since the device embodiment corresponds to the method embodiment, reference may be made to the method embodiment for the relevant parts. The described device embodiments are merely schematic, the modules described as separate parts may or may not be physically separated. Some or of the modules may be selected as needed to achieve the objects of the solutions of the embodiments. Those skilled in the art can understand and implement the embodiments without any creative work.

The visual detection and search method and device of the present disclosure have been described based on the embodiments and application examples. In addition, the present disclosure also provides a terminal and a storage medium, which are described below.

Figure 9:
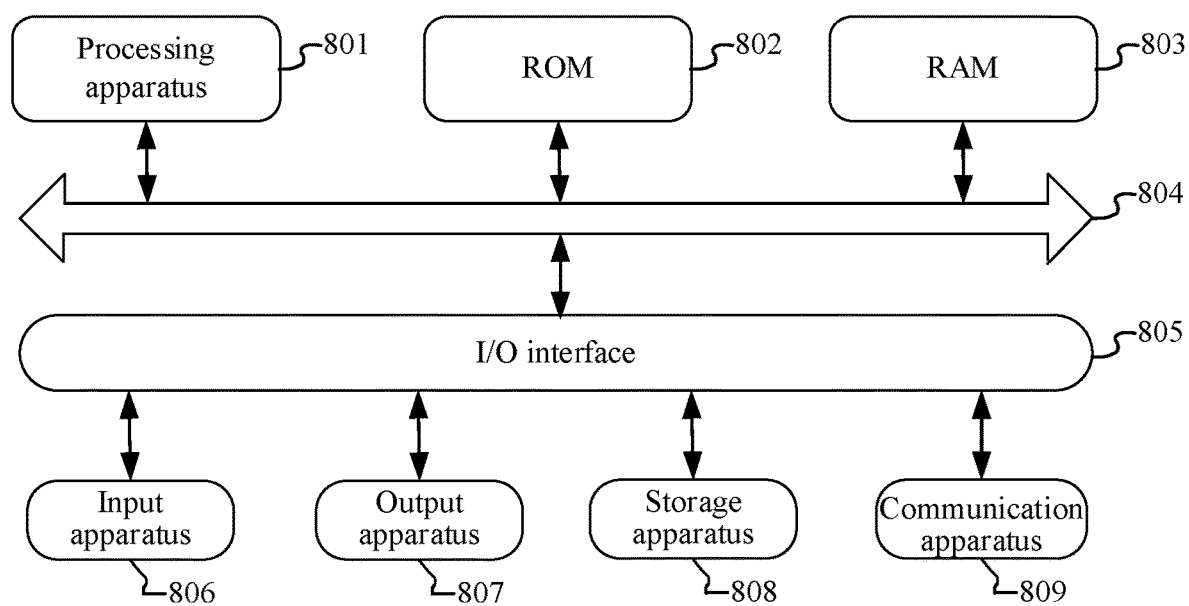
FIG. 9 is a schematic structural diagram of an electronic device according to an embodiment of the present disclosure.

Reference is made to FIG. 9 which shows a schematic structural diagram of an electronic device 800 (such as terminals or servers) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 9 is schematic, and is not intended to limit functions and scope of the embodiments of the present disclosure.

As shown in FIG. 9, the electronic device 800 may include a processing apparatus (such as a central processor and a graphic processor) 801. The processing apparatus may perform various appropriate actions and processing by executing programs stored in a read-only memory (ROM) 802 or programs uploaded from a storage apparatus 808 to a random access memory (RAM) 803. Various programs and data required for operations of the electronic device 800 are also stored in the RAM 803. The processing apparatus 801, the ROM 802 and the RAM 803 are connected to each other through the bus 804. An input/output (I/O) interface 805 is also connected to the bus 804.

Generally, the following components are connected to the I/O interface 805: an input apparatus 806 such as a touch screen, a touch panel, a keyboard, a mouse, a camera, a microphone, an accelerometer, and gyroscope; an output apparatus 807 such as a liquid crystal display (LCD), a loudspeaker and a vibrator; a storage apparatus 808 such as a magnetic tape and a hard disk; and a communication apparatus 809. The communication apparatus 809 may allow the electronic device 800 to communicate with other device in a wired or wireless manner to exchange data. Although FIG. 9 shows the electronic device 800 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a computer readable medium is provided. The computer program includes program codes for performing the method shown in the flowchart. In such embodiment, the computer program may be downloaded and installed from the network through the communication apparatus 809, installed from the storage apparatus 808 or installed from the ROM 802. The computer program is executed by the processing apparatus 801 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RE) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the method according to the disclosure.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case.

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

A method for video search is provided according to one or more embodiments of the disclosure, the method includes: receiving a first event generated by triggering a first control in a video playback page; acquiring, in response to the first event, a current video image frame played in the video playback page when the first event is triggered; acquiring a first to-be-searched target positioned by a second control in the current video image frame and a first display position of the first to-be-searched target in the current video image frame, and displaying the second control on the first display position; and acquiring a first recommendation result corresponding to the first to-be-searched target, and displaying the first recommendation result in a search result page.

In the method provided according to one or more embodiments of the disclosure, the second control includes at least one of a floating box or a floating point.

In the method provided according to one or more embodiments of the disclosure, the first to-be-searched target includes a first target and a second target, and the second control includes the floating box and the floating point, the acquiring a first to-be-searched target positioned by a second control in the current video image frame and a first display position of the first to-be-searched target in the current video image frame, and displaying the second control on the first display position includes: acquiring the first target positioned by the floating box and the second target positioned by the floating point in the current video image frame; acquiring a display position of the first target in the current video image frame and a display position of the second target in the current video image frame; and displaying the floating box on the display position of the first target in the current video image frame, and displaying the floating point on the display position of the second target in the current video image frame.

In the method provided according to one or more embodiments of the disclosure, the acquiring a first recommendation result corresponding to the first to-be-searched target and displaying the first recommendation result in a search result page includes: acquiring a first to-be-recommended result corresponding to the first target and a second to-be-recommended result corresponding to the second target; displaying a first label for identifying the first target and the first to-be-recommended result on a first area in the search result page; and displaying a second label for identifying the second target and the second to-be-recommended result on a second area in the search result page.

In the method provided according to one or more embodiments of the disclosure, the first to-be-searched target includes a valid target and an invalid target, and the method further includes: acquiring all video image frames of a video played in the video playback page; and acquiring the valid target of each of the video image frames to obtain global results, where the valid target includes at least one of a person, a commodity and an item; the invalid target is a target result other than the valid target.

In the method provided according to one or more embodiments of the disclosure, the acquiring a first recommendation result corresponding to the first to-be-searched target and displaying the first recommendation result in a search result page further includes: if the first to-be-searched target is the valid target, acquiring the first recommendation result corresponding to the valid target and displaying the first recommendation result in the search result page; if the first to-be-searched target is the invalid target, displaying prompt information indicating that there is no search result in the search result page; or if the first to-be-searched target is the valid target, acquiring the first recommendation result corresponding to the valid target and sequentially displaying the first recommendation result and the global results other than the first recommendation result in the search result page; if the first to-be-searched target is the invalid target, displaying the global results in the search result page.

In the method provided according to one or more embodiments of the disclosure, before the acquiring a first recommendation result corresponding to the first to-be-searched target and displaying the first recommendation result in a search result page, the method further includes: receiving a second event generated by triggering a second control; and evoking, in response to the second event, the search result page, where the search result page at least partially covers the current video image frame and blocks the second control.

In the method provided according to one or more embodiments of the disclosure, after the acquiring a first recommendation result corresponding to the first to-be-searched target and displaying the first recommendation result in a search result page, the method further includes: moving the search result page to an edge of the current video image frame and hiding a part of the search result page to display the second control.

The method provided according to one or more embodiments of the disclosure further includes: detecting whether the first display position where the second control is located has changed, and acquiring a second display position of the second control in a case that the first display position where the second control is located has changed; determining a second to-be-searched target based on the second display position; acquiring a second recommendation result corresponding to the second to-be-searched target; and evoking the search result page, and replacing the first recommendation result in the search result page with the second recommendation result.

A device for video search is provided according to one or more embodiments of the disclosure. The device includes: a receiving module, configured to receive a first event generated by triggering a first control; an acquiring module, configured to acquire a current video image frame played in the video playback page when the first event is triggered, a first to-be-searched target positioned by a second control in the current video image frame and a first display position of the first to-be-searched target in the current video image frame, and a first recommendation result corresponding to the first to-be-searched target; and a displaying module, configured to display the first recommendation result in a search result page.

A terminal is provided according to one or more embodiments of the disclosure. The terminal includes: at least one memory configured to store program codes; and at least one processor configured to invoke the program codes stored in the at least one memory to perform the method described above.

A storage medium is provided according to one or more embodiments of the disclosure. The storage medium stores program codes for performing the method described above.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A method for video search, comprising:
    receiving a first event generated by triggering a first control in a video playback page;
    acquiring, in response to the first event, a current video image frame played in the video playback page when the first event is triggered;
    acquiring a first to-be-searched target positioned by a second control in the current video image frame and a first display position of the first to-be-searched target in the current video image frame, and displaying the second control on the first display position;
    acquiring a first recommendation result corresponding to the first to-be-searched target, and displaying the first recommendation result in a search result page;
    wherein before the acquiring a first recommendation result corresponding to the first to-be-searched target and displaying the first recommendation result in a search result page, the method further comprises:
    receiving a second event generated by triggering the second control; and
    evoking, in response to the second event, the search result page, wherein the search result page at least partially covers the current video image frame and blocks the second control.

2. The method according to claim 1, wherein the second control comprises at least one of a floating box or a floating point.

3. The method according to claim 2, wherein the first to-be-searched target comprises a first target and a second target, wherein the second control comprises the floating box and the floating point, and wherein the acquiring a first to-be-searched target positioned by a second control in the current video image frame and a first display position of the first to-be-searched target in the current video image frame, and displaying the second control on the first display position further comprises:
    acquiring the first target positioned by the floating box and the second target positioned by the floating point in the current video image frame;
    acquiring a display position of the first target in the current video image frame and a display position of the second target in the current video image frame; and
    displaying the floating box on the display position of the first target in the current video image frame, and displaying the floating point on the display position of the second target in the current video image frame.

4. The method according to claim 3, wherein the acquiring a first recommendation result corresponding to the first to-be-searched target and displaying the first recommendation result in a search result page comprises:
    acquiring a first to-be-recommended result corresponding to the first target and a second to-be-recommended result corresponding to the second target;
    displaying a first label for identifying the first target and the first to-be-recommended result on a first area in the search result page; and
    displaying a second label for identifying the second target and the second to-be-recommended result on a second area in the search result page.

5. The method according to claim 1, wherein the first to-be-searched target comprises a valid target and an invalid target, and the method further comprises:
    acquiring all video image frames of a video played in the video playback page; and
    acquiring the valid target of each of the video image frames to obtain global results, wherein the valid target comprises at least one of a person, a commodity and an item, and the invalid target is a target result other than the valid target.

6. The method according to claim 5, wherein the acquiring a first recommendation result corresponding to the first to-be-searched target and displaying the first recommendation result in a search result page further comprises:
    when the first to-be-searched target is the valid target, acquiring the first recommendation result corresponding to the valid target and displaying the first recommendation result in the search result page, and when the first to-be-searched target is the invalid target, displaying prompt information indicating that there is no search result in the search result page; or when the first to-be-searched target is the valid target, acquiring the first recommendation result corresponding to the valid target and sequentially displaying the first recommendation result and the global results other than the first recommendation result in the search result page, and when the first to-be-searched target is the invalid target, displaying the global results in the search result page.

7. The method according to claim 1, wherein after the acquiring a first recommendation result corresponding to the first to-be-searched target and displaying the first recommendation result in a search result page, the method further comprises:

moving the search result page to an edge of the current video image frame and hiding a part of the search result page to display the second control.

8. The method according to claim 7, further comprising:

detecting whether the first display position where the second control is located has changed, and acquiring a second display position of the second control in a case that the first display position where the second control is located has changed;

determining a second to-be-searched target based on the second display position;

acquiring a second recommendation result corresponding to the second to-be-searched target; and evoking the search result page, and replacing the first recommendation result in the search result page with the second recommendation result.

9. A device for video search, comprising:

at least one processor; and at least one memory communicatively coupled to the at least one processor and storing instructions that upon execution by the at least one processor cause the device to perform operations comprising:

receiving a first event generated by triggering a first control in a video playback page;

acquiring, in response to the first event, a current video image frame played in the video playback page when the first event is triggered;

acquiring a first to-be-searched target positioned by a second control in the current video image frame and a first display position of the first to-be-searched target in the current video image frame, and displaying the second control on the first display position;

acquiring a first recommendation result corresponding to the first to-be-searched target, and displaying the first recommendation result in a search result page;

wherein before the acquiring a first recommendation result corresponding to the first to-be-searched target and displaying the first recommendation result in a search result page, the operations further comprise:

receiving a second event generated by triggering a second control; and evoking, in response to the second event, the search result page, wherein the search result page at least partially covers the current video image frame and blocks the second control.

10. The device according to claim 9, wherein the second control comprises at least one of a floating box or a floating point.

11. The device according to claim 10, wherein the first to-be-searched target comprises a first target and a second target, wherein the second control comprises the floating box and the floating point, and wherein the acquiring a first to-be-searched target positioned by a second control in the current video image frame and a first display position of the first to-be-searched target in the current video image frame, and displaying the second control on the first display position further comprises:

acquiring the first target positioned by the floating box and the second target positioned by the floating point in the current video image frame;

acquiring a display position of the first target in the current video image frame and a display position of the second target in the current video image frame; and displaying the floating box on the display position of the first target in the current video image frame, and displaying the floating point on the display position of the second target in the current video image frame.

12. The device according to claim 11, wherein the acquiring a first recommendation result corresponding to the first to-be-searched target and displaying the first recommendation result in a search result page comprises:

acquiring a first to-be-recommended result corresponding to the first target and a second to-be-recommended result corresponding to the second target;

displaying a first label for identifying the first target and the first to-be-recommended result on a first area in the search result page; and displaying a second label for identifying the second target and the second to-be-recommended result on a second area in the search result page.

13. The device according to claim 9, wherein the first to-be-searched target comprises a valid target and an invalid target, and the at least one memory communicatively coupled to the at least one processor and storing instructions that upon execution by the at least one processor also cause the device to:

acquiring all video image frames of a video played in the video playback page; and acquiring the valid target of each of the video image frames to obtain global results, wherein the valid target comprises at least one of a person, a commodity and an item, and the invalid target is a target result other than the valid target.

14. The device according to claim 13, wherein the acquiring a first recommendation result corresponding to the first to-be-searched target and displaying the first recommendation result in a search result page further comprises:

when the first to-be-searched target is the valid target, acquiring the first recommendation result corresponding to the valid target and displaying the first recommendation result in the search result page, and when the first to-be-searched target is the invalid target, displaying prompt information indicating that there is no search result in the search result page; or when the first to-be-searched target is the valid target, acquiring the first recommendation result corresponding to the valid target and sequentially displaying the first recommendation result and the global results other than the first recommendation result in the search result page, and when the first to-be-searched target is the invalid target, displaying the global results in the search result page.

15. The device according to claim 9, wherein after the acquiring a first recommendation result corresponding to the first to-be-searched target and displaying the first recommendation result in a search result page, the operations further comprise:

moving the search result page to an edge of the current video image frame and hiding a part of the search result page to display the second control.

16. The device according to claim 15, the at least one memory communicatively coupled to the at least one processor and storing instructions that upon execution by the at least one processor also cause the device to perform operations comprising:
   detecting whether the first display position where the second control is located has changed, and acquiring a second display position of the second control in a case that the first display position where the second control is located has changed;
   determining a second to-be-searched target based on the second display position;
   acquiring a second recommendation result corresponding to the second to-be-searched target; and
   evoking the search result page, and replacing the first recommendation result in the search result page with the second recommendation result.

17. A non-transitory storage medium bearing computer-readable instructions that upon execution on a computing device cause the computing device at least to perform operations comprising:
   receiving a first event generated by triggering a first control in a video playback page;
   acquiring, in response to the first event, a current video image frame played in the video playback page when the first event is triggered;
   acquiring a first to-be-searched target positioned by a second control in the current video image frame and a first display position of the first to-be-searched target in the current video image frame, and displaying the second control on the first display position;
   acquiring a first recommendation result corresponding to the first to-be-searched target, and displaying the first recommendation result in a search result page;
   wherein before the acquiring a first recommendation result corresponding to the first to-be-searched target and displaying the first recommendation result in a search result page, the operations further comprise:
   receiving a second event generated by triggering a second control; and
   evoking, in response to the second event, the search result page, wherein the search result page at least partially covers the current video image frame and blocks the second control.

18. The non-transitory storage medium of claim 17, wherein the first to-be-searched target comprises a first target and a second target, wherein the second control comprises a floating box and a floating point, and wherein the acquiring a first to-be-searched target positioned by a second control in the current video image frame and a first display position of the first to-be-searched target in the current video image frame, and displaying the second control on the first display position further comprises:
   acquiring the first target positioned by the floating box and the second target positioned by the floating point in the current video image frame;
   acquiring a display position of the first target in the current video image frame and a display position of the second target in the current video image frame; and
   displaying the floating box on the display position of the first target in the current video image frame, and displaying the floating point on the display position of the second target in the current video image frame.

19. The non-transitory storage medium of claim 17, wherein the first to-be-searched target comprises a valid target and an invalid target, and wherein the operations further comprise:
   acquiring all video image frames of a video played in the video playback page; and
   acquiring the valid target of each of the video image frames to obtain global results, wherein the valid target comprises at least one of a person, a commodity and an item, and the invalid target is a target result other than the valid target.

20. The non-transitory storage medium of claim 19, wherein the acquiring a first recommendation result corresponding to the first to-be-searched target and displaying the first recommendation result in a search result page further comprises:
   when the first to-be-searched target is the valid target, acquiring the first recommendation result corresponding to the valid target and displaying the first recommendation result in the search result page, and when the first to-be-searched target is the invalid target, displaying prompt information indicating that there is no search result in the search result page; or
   when the first to-be-searched target is the valid target, acquiring the first recommendation result corresponding to the valid target and sequentially displaying the first recommendation result and the global results other than the first recommendation result in the search result page, and when the first to-be-searched target is the invalid target, displaying the global results in the search result page.

* * * * *